(12) United States Patent
Thompson et al.

(10) Patent No.: US 12,075,736 B1
(45) Date of Patent: Sep. 3, 2024

(54) PLATFORM TRAY

(71) Applicants: Justin Clay Thompson, Holt, MO (US); Rebecca Jones Thompson, Holt, MO (US)

(72) Inventors: Justin Clay Thompson, Holt, MO (US); Rebecca Jones Thompson, Holt, MO (US)

( * ) Notice: Subject to any disclaimer, the term of this patent is extended or adjusted under 35 U.S.C. 154(b) by 0 days.

(21) Appl. No.: 18/501,565

(22) Filed: Nov. 3, 2023

Related U.S. Application Data

(60) Provisional application No. 63/424,902, filed on Nov. 12, 2022.

(51) Int. Cl.
*A01G 9/04* (2006.01)
*A01G 9/02* (2018.01)
(Continued)

(52) U.S. Cl.
CPC ........... *A01G 9/021* (2013.01); *A01G 27/008* (2013.01)

(58) Field of Classification Search
CPC . A01G 9/021; A01G 9/04; A01G 9/02; A01G 9/028; A01G 24/44; A47G 7/00; A47G 7/02; A47G 7/04; A47G 7/041; A47G 7/044; A47G 7/042; B65D 25/02; B65D 1/22; B65D 1/34; B65D 1/36; B65D 1/41; A42B 1/004; A42B 1/24; A42C 5/00
(Continued)

(56) References Cited

U.S. PATENT DOCUMENTS

| 75,555 | A | * | 3/1868 | Lilley | ............. | A01G 9/04 47/71 |
| 1,879,784 | A | * | 9/1932 | Benz | ............. | A01G 9/04 47/80 |

(Continued)

FOREIGN PATENT DOCUMENTS

| CA | 2310819 A1 * | 12/2001 | ............ A01G 31/02 |
| FR | 398521 A * | 6/1909 | |

OTHER PUBLICATIONS

Square Bowl for Floral Foam Riser [online]. Wintercraft, Apr. 4, 2023. Retrieved from the Internet: <URL: www.wintercraft.com/products/square-bowl-for-floral-foam-riser>.
(Continued)

*Primary Examiner* — Kristen C Hayes
(74) *Attorney, Agent, or Firm* — CreatiVenture Law, LLC; Dennis J M Donahue, III

(57) ABSTRACT

A tray for supporting floral arrangements has a base with a periphery, an interior section within the periphery, and an open section within the interior section. An exterior sidewall and an interior sidewall are respectively attached to and disposed around the base's periphery and interior section. The interior sidewall is spaced inwardly from the exterior sidewall and forms a channel between the interior sidewall and the exterior sidewall. An angled flange is attached to the exterior sidewall. A platform with a flat top and a curved perimeter is attached to the interior sidewall's distal end. The interior sidewall is tapered from its proximal end to its distal end and surrounds a hollow space within the interior section of the base. Multiple trays are stacked in a nesting arrangement with one tray's platform extending through another tray's open section into its hollow space.

23 Claims, 15 Drawing Sheets

(51) Int. Cl.
*A01G 27/00* (2006.01)
*A47G 7/02* (2006.01)

(58) Field of Classification Search
USPC .................................................. 220/608, 609
See application file for complete search history.

(56) References Cited

U.S. PATENT DOCUMENTS

| | | | |
|---|---|---|---|
| 1,928,799 | A | 10/1933 | Stevens |
| 3,183,624 | A | 5/1965 | Swett |
| D229,073 | S * | 11/1973 | Brickel .......................... 119/61.5 |
| 4,418,496 | A | 12/1983 | Koistinen |
| 4,788,792 | A * | 12/1988 | Womick ................. A01G 9/028 |
| | | | 47/41.12 |
| 7,096,623 | B2 | 8/2006 | Cardamone et al. |
| 8,943,657 | B1 | 2/2015 | Perry et al. |
| 2012/0036771 | A1 | 2/2012 | Harshman |
| 2017/0281449 | A1 * | 10/2017 | Podolske ............... A61G 17/08 |
| 2019/0209410 | A1 | 7/2019 | Lieberstein |

OTHER PUBLICATIONS

Design Ring [online]. Oasis Floral Products NA, Oct. 11, 2023. Retrieved from the Internet: <URL: www.oasisfloralproducts.com/collections/all-floral-foam/products/design-ring-1>.

* cited by examiner

220 Cut Water-Absorbing Foam to Size

222 Trim Water-Absorbing Foam & Insert into Channels

224 Insert Water-Absorbing Foam into Remaining Open Channels

PLATFORM TRAY

CROSS-REFERENCE TO RELATED APPLICATIONS

This application claims priority from U.S. Provisional Patent Application Ser. No. 63/424,902 filed on Nov. 12, 2022 which is incorporated by reference herein.

STATEMENT REGARDING FEDERALLY SPONSORED RESEARCH

Not Applicable.

APPENDIX

Not Applicable.

BACKGROUND OF THE INVENTION

Field of the Invention

The present invention relates to floral planters and trays with presentation platforms, and more particularly to floral planters and trays with presentation platforms that can be nested together.

Related Art

Floral trays come in a variety of shapes and sizes. Most floral trays are a single tier and have a continuous flat base between the tray's exterior sidewalls. When a platform is to be used to raise a centerpiece above the floral arrangement, floral designers may use adhesive, wire, floral pins, or tape to secure a separate platform or moisture barrier film to the base. Additionally, floral designers must typically glue or tape bricks of water-absorbing foam to the base so the stems of the flowers and other cut plants can be secured within a water reservoir for longer life. Very few floral trays have a flange around their outer sidewalls which makes them less graspable and hard to handle. Those floral trays with a flange typically have a design in which the flange extends horizontally outward from the outer sidewalls parallel to the base, or it may even be swept upwards away from the base. Although these flanges help with lifting the tray from a table or other flat work surface, they do not provide a secure grip for a person's fingers to hold the tray.

Stackable floral trays and planting trays with tapered columns or platforms have been known, such as the examples in U.S. Pat. No. 1,928,799 and US Pat. App. Pub. No. 2012/0036771 which are incorporated by reference herein. These stackable trays can be nested with each other to reduce the space required for shipment and storage, but they are particularly designed to elevate the trays sufficiently above each other to allow multiple arrangements of flowers and other plants in the trays at different heights. Similar to the single-tier floral trays, the stackable trays fail to include a flange that can be securely gripped, and they still require floral designers to glue or tape the water-absorbing foam to the base. Additionally, as with single-tier floral trays which do not have any interior structure rising above the base, neither of the stacking trays has any tab, ridge, or other ledge extending from one of the sidewalls to limit the extent to which the trays can nest for shipment and storage which can make it difficult to separate the trays from each other for use. The columns and platforms are designed to elevate the trays of different lateral dimensions, and when the columns have different lateral dimensions, such as in the '799 Patent, the columns must be separable from the trays. Additionally, the columns do not have a top so a separate topside would have to be used for a column to serve as a platform. The platforms in the '771 Application have the same lateral dimensions and include a topside, but these platforms also include an upwardly extending rib around their periphery and they extend up from the base to a height that is more than three (3) times the height of the exterior sidewalls.

In the nesting tray industry, it is common to use trays of different sizes, such as shown and described in the '799 Patent and the '771 Application. Trays of different sizes may be good for stacking purposes, but they require floral designers to glue or tape the water-absorbing foam to the base, and they do not allow floral designers to optimize their use of water-absorbing foam. When the trays are the same size, such as shown in FIGS. 8A and 8B of the '771 Application, the exterior sidewalls are flared out by at least seven to ten degrees)(7°-10° to make them easily separable and to help prevent the trays from becoming wedged together. However, when the exterior sidewalls are flared out beyond five degrees (5°), it is much more difficult to obtain a friction fit between the sidewalls and the water-absorbing foam which also requires the floral designers to glue or tape the water-absorbing foam to the base to secure it.

The '799 Patent discloses hollow columns that are used to stack trays at various heights. The columns necessarily have a rib around their top end that engages with a flange that extends downward from the bottom of the tray that sits on top of the column; it appears from the drawings that the column does not have any topside which is understandable since a tray is intended to sit on top of the column. The '771 Application discloses hollow riser platforms that are also used to stack trays at various heights. The riser platforms have a topside but also disclose a rib (i.e., "security rib") extending upward from the topside for the purpose of keeping design features in place and which is also used to engage the universal stacking support. It would be beneficial to design a platform with a topside that doesn't have a rib that extends up from it.

Accordingly, there remains a need for floral trays that can be securely gripped and held with a downward swept flange and which reduce or eliminate the need for adhesive, wires, and/or tape to secure water-absorbing foam and also flat platforms in many cases. It is also desired that the floral trays can be nested for shipment and storage and that they can be easily separated when needed for use to create a floral arrangement. It is also desired to reduce the amount of water-absorbing foam that is required in floral trays for the floral arrangements and also reduce the weight of the tray while providing sufficient strength and support for the floral arrangements so the tray doesn't break.

SUMMARY OF THE INVENTION

In one aspect of the invention, a tray for supporting floral arrangements has a base with a periphery, an interior section within the periphery, and an open section within the interior section. An exterior sidewall and an interior sidewall are respectively attached to and disposed around the base's periphery and interior section, and a platform is attached to the interior sidewall at its distal end. The interior sidewall is spaced inwardly from the exterior sidewall and forms a channel between the interior sidewall and the exterior sidewall. A flange flares out from and attaches to the free end of the exterior sidewall. The flange is oriented at an acute angle relative to the exterior sidewall and forms a groove between the flange and the exterior sidewall which is continuous around the exterior sidewall's perimeter.

In another aspect of the invention, the platform has a flat top and a radiused perimeter with the interior sidewall, and the interior sidewall is tapered from its proximal end to its distal end and surrounds a hollow space within the interior section of the base. Multiple trays are stacked in a nesting arrangement with one tray's platform extending through another tray's open section into its hollow space. To limit the extent to which the trays nest into each other, a ledge protrudes into the channel from either the interior sidewall and/or the exterior sidewall.

Further areas of applicability of the present invention will become apparent from the detailed description provided hereinafter.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
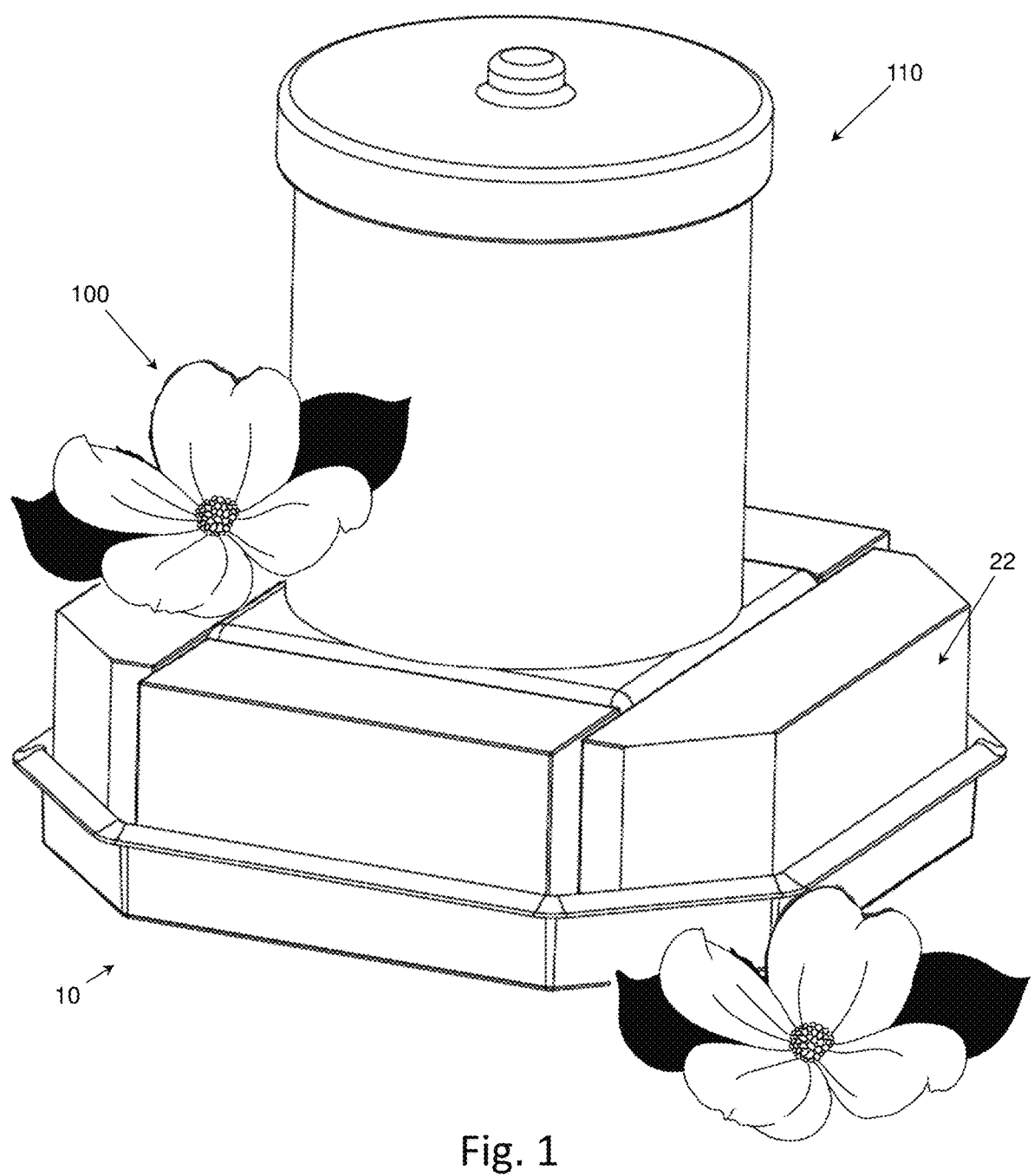
FIG. 1 is an upper perspective view of one embodiment of the platform tray according to the present invention with blocks of water-absorbing foam and an urn.
Figure 2:
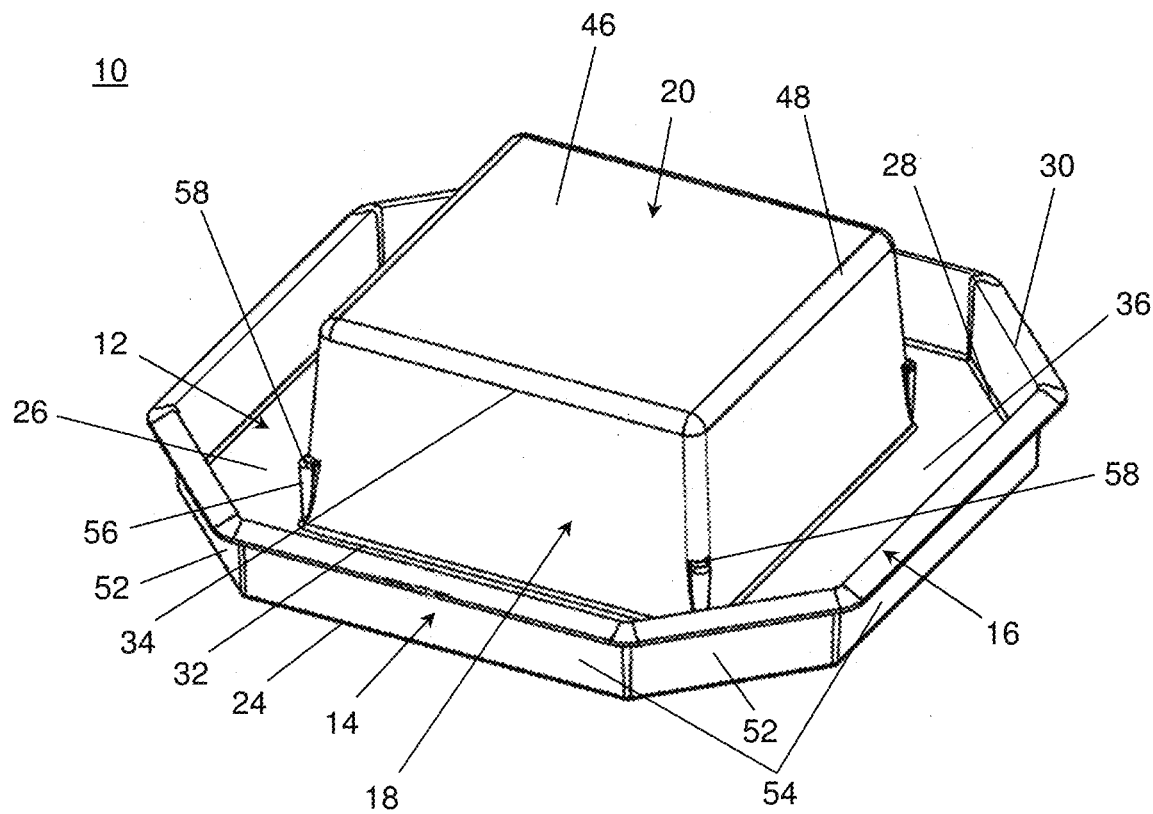
FIG. 2 is an upper perspective view of the platform tray shown in FIG. 1.
Figure 3:
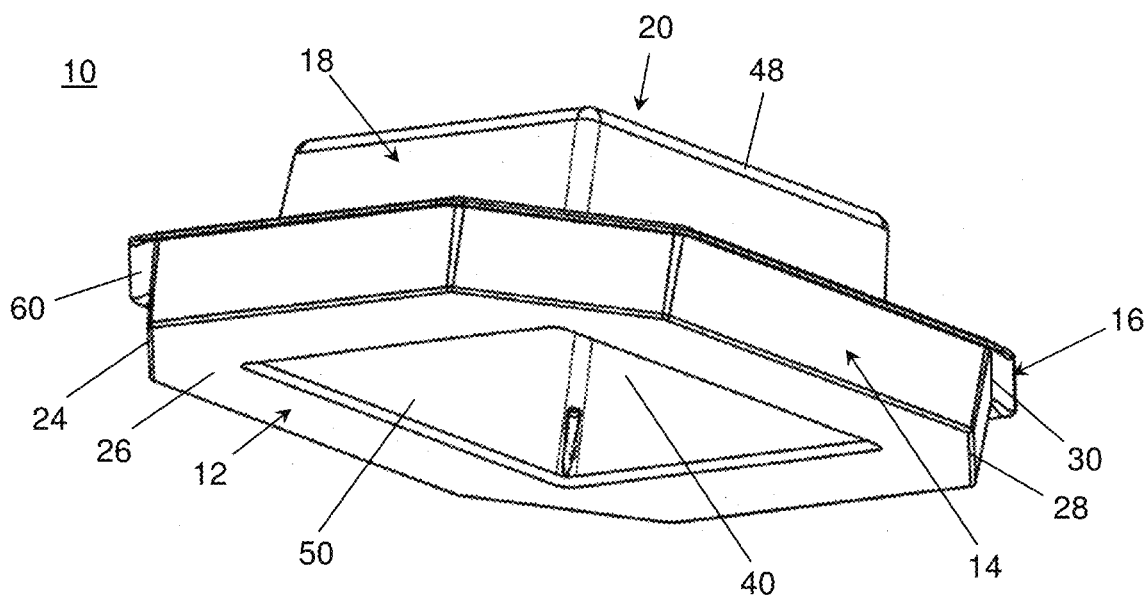
FIG. 3 is a lower perspective view of the platform tray shown in FIG. 1.
Figure 4A:
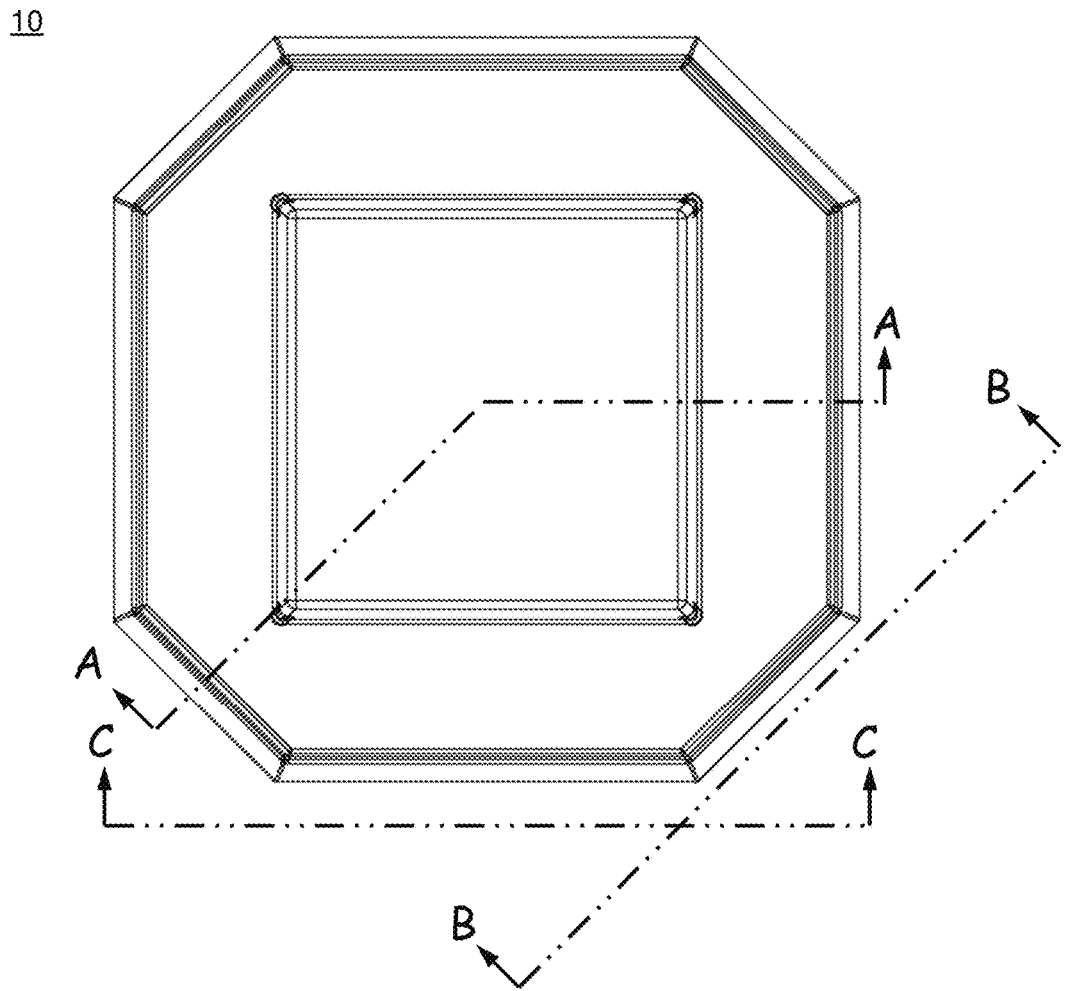
FIG. 4A is a top plan view of the platform tray shown in FIG. 1.
Figure 4B:
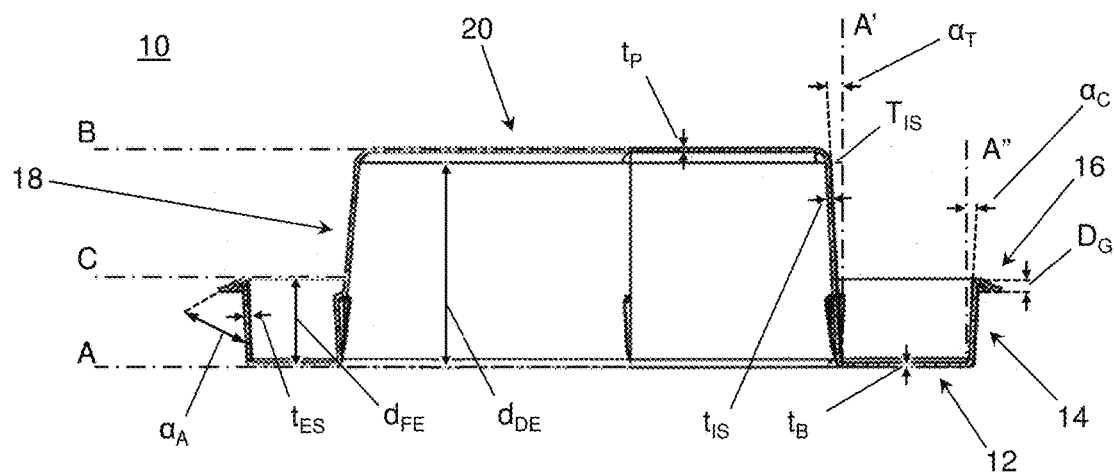
FIG. 4B is a cross-sectional side view of the platform tray shown in FIG. 1 as taken along Section A-A in FIG. 4A.
Figure 5:
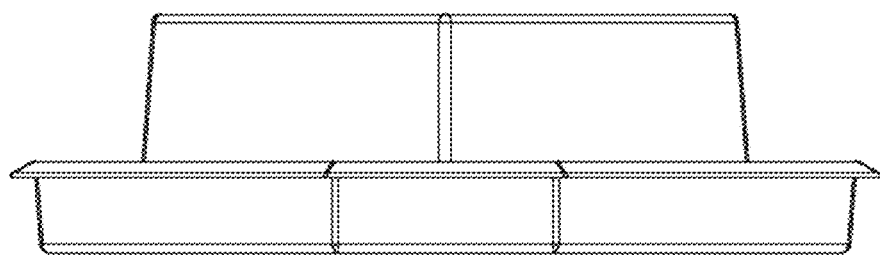
FIG. 5 is a three-quarter elevation view of the platform tray shown in FIG. 1 as seen from View B-B in FIG. 4A.
Figure 6:
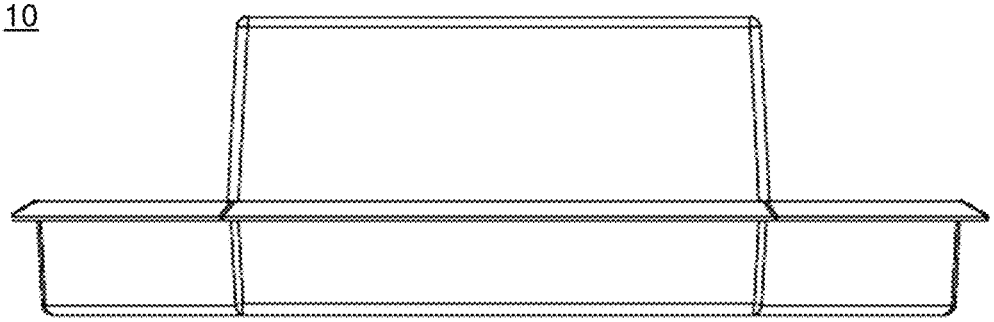
FIG. 6 is a front elevation view of the platform tray shown in FIG. 1 as seen from View C-C in FIG. 4A.
Figure 7:
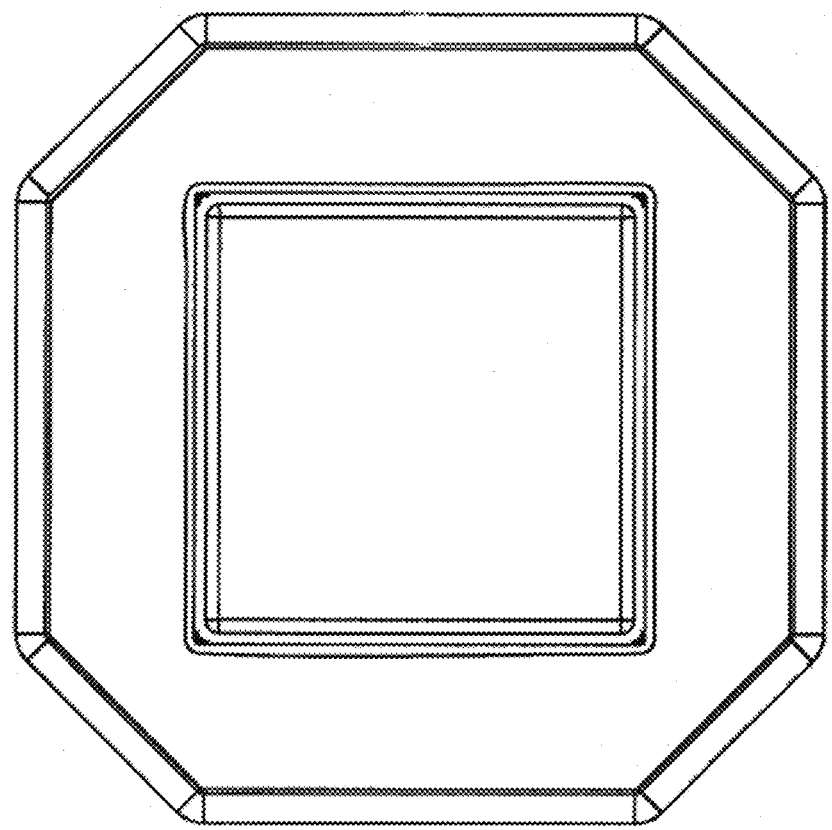
FIG. 7 is a bottom plan view of the platform tray shown in FIG. 1.
Figure 8A:
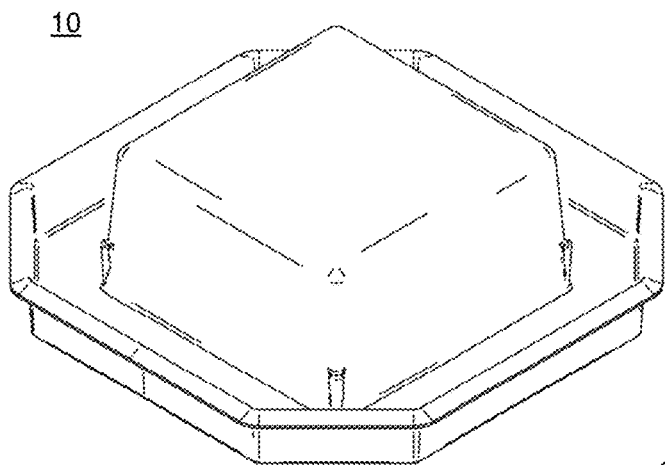
FIGS. 8A-8D are a shaded upper perspective view, a shaded lower perspective view, a shaded top plan view, and a shaded bottom plan view of the platform tray shown in FIG. 1, respectively.
Figure 8B:
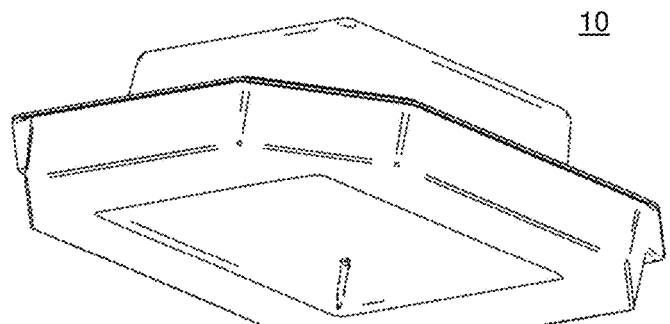
Figure 8C:
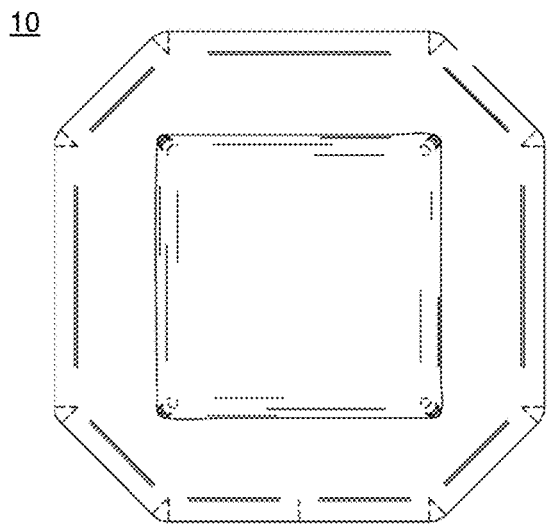
Figure 8D:
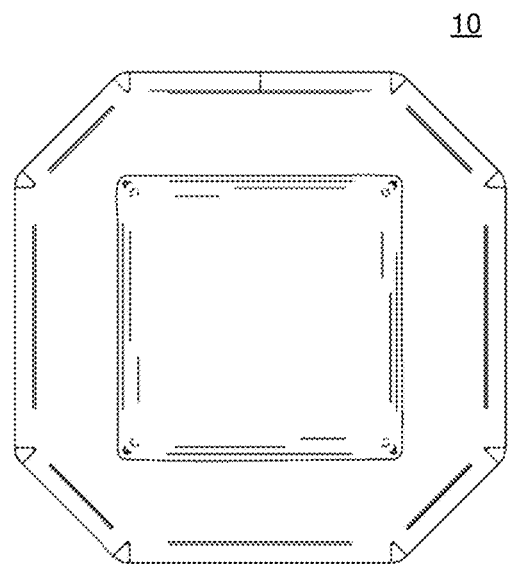

The tray 10 described herein can be used with water-absorbing foam 22 to support floral arrangements 100 as a floral tray or can be used with soil and live plants as a germination tray, cultivation tray, and/or live plant wreath tray. As shown in FIG. 1, the water-absorbing foam is placed within the tray, and a centerpiece 110 is placed on top of the tray's platform 20. As particularly shown in FIGS. 2-8, the tray has a base 12 with a periphery 24 and an interior section 26 within the periphery. An exterior sidewall 14 is disposed around the periphery of the base and extends from a fixed end 28 to a free end 30, preferably being canted outwardly. The free end is in a plane (C) spaced a distance ($d_{FE}$) away from the plane (A) of the base. A flange 16 flares out from and is fixedly attached to the free end of the exterior sidewall. The flange is oriented at an acute angle ($\alpha_A$) relative to the exterior sidewall and forms a groove 60 between the flange and the exterior sidewall. An interior sidewall 18 is disposed around the interior section of the base and extends from a proximal end 32 to a distal end 34. The proximal end is supported by the base, and the distal end is in a plane (C) that is spaced a distance ($d_{DE}$) away from the base. The distal end of the interior sidewall is spaced a greater distance from the base than the free end of the exterior sidewall but is less than three times the distance of the free end to the base ($3*d_{FE} > d_{DE} > d_{FE}$). The interior sidewall is spaced inwardly from the exterior sidewall and forms a channel 36 between the interior sidewall and the exterior sidewall. The interior sidewall is tapered from the proximal end to the distal end and surrounds a hollow space 40 within the interior section of the base. The platform 20 is fixedly attached to the interior sidewall at its distal end.

Figure 9A:
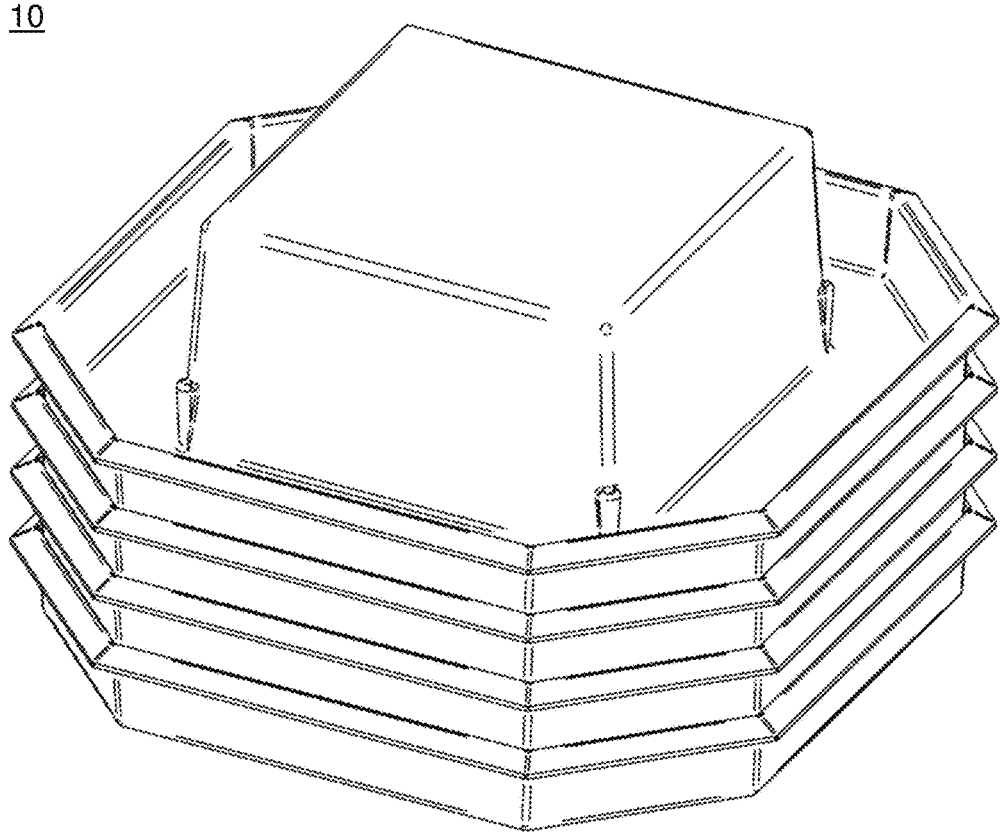
FIG. 9A is a front perspective view of nested platform trays according to the present invention.
Figure 9B:
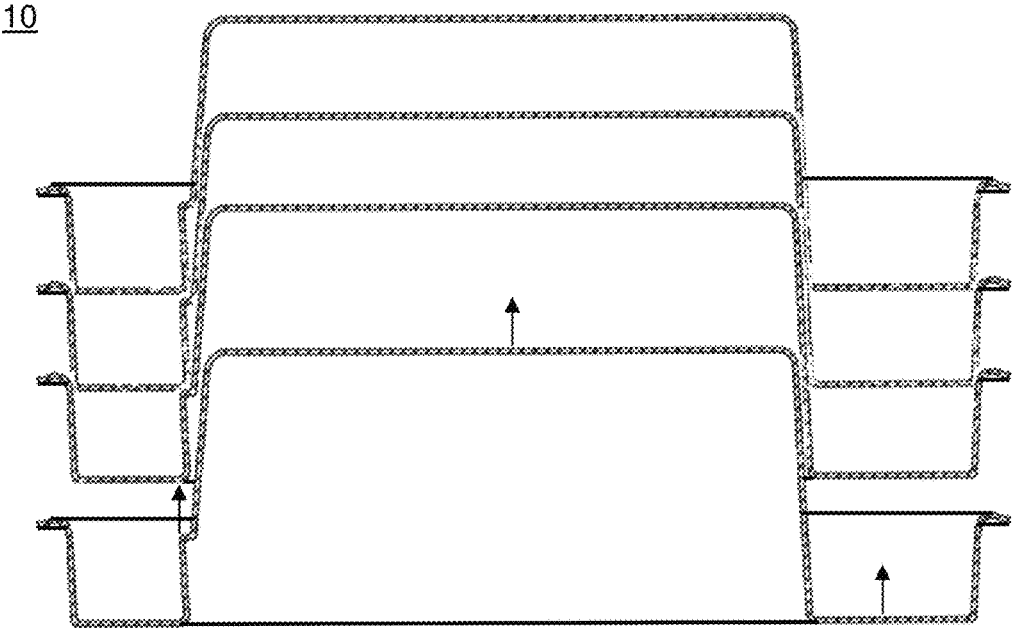
FIG. 9B is a cross-sectional view of nested platform trays according to the present invention.

Preferably, the tray is made from a single piece of plastic so the base, exterior sidewall, interior sidewall, flange, and platform are all integrally formed with each other. When the tray is thermoformed from a single sheet of plastic, the base, sidewalls, flange, and platform can have the same thickness ($t_P$). It will be appreciated that there can be some variation in the thickness for the various parts of the tray. Preferably, the thickness of the interior sidewall ($t_{IS}$) and the exterior sidewall ($t_{ES}$) is between one half and twice the thickness of the base's interior section ($t_B$), i.e., $\frac{1}{2}t_B < t_{ES}$, $t_{ES} < 2*t_P$. With this single-piece construction, the base has an open section 50 spaced inwardly of the interior section in the hollow space, and as shown in FIGS. 9A and 9B, multiple trays can nest with each other. When trays are nested together, one tray's platform extends through an adjacent tray's open section into the hollow space. The tray preferably includes tabs 56 that are integrally formed with the corners of the interior sidewall and which form ledges 58 that protrude into the channel. In the nesting configuration, the ledge stops the tray's platform from advancing further into the adjacent tray's hollow space when the ledge of the advancing tray engages the base of the adjacent tray. It will be appreciated that the ledge could also protrude into the channel from the exterior sidewall to engage the base of the adjacent tray, or the ledge may even protrude from the interior sidewall into the hollow space in which case the ledge would be in the adjacent tray and would engage the radiused perimeter or the top of the platform in the advancing tray. The ledge can be formed as a tab as shown or may be formed by a ridge or some other protruding structure. Generally, the ledge protrudes into the channel over the base's interior section or into the hollow space under the radiused perimeter and the platform. The ledge limits the extent to which the trays can nest for shipment and storage which more easily allows floral designers to separate the trays from each other for their use, and the ledge is preferably located between the base plane (A) and the free end plane (C) so at least a portion of the exterior sidewalls also nest with each other.

The single-piece construction removes seams or joints which can be potential points of failure, and the single sheet also creates a moisture barrier which prevents water from leaking out of the tray. Thermoformed plastic is preferably used in the construction of the trays for durability and affordability. Without seams or joints, the tray is more sturdy and is less likely to crack. Additionally, the single-piece construction avoids any need for assembly. As explained above for traditional floral trays, user would typically use adhesive, pins, wire, and/or tape to secure a separate platform to the base (or moisture barrier film with pins) so the single-piece construction saves time for the users to move directly into preparing the water-absorbing foam bricks and placing them in the channels of the tray. In the embodiments shown in FIGS. 1-18, the interior sidewall has a quadrilateral cross-sectional shape in the base plane, i.e., square in FIGS. 1-10 and rectangular in FIGS. 11-18, while the exterior sidewall has an octagonal cross-sectional shape in the base plane as particularly shown in FIG. 7, with short sidewall sections 52 extending between pairs of long sidewall sections 54. In the cross-section along the base plane, the long exterior sidewall sections are preferably parallel to the interior sidewall's quadrilateral sides. As explained below, the shape of the sidewalls helps with securing the bottom section 42 of the water-absorbent foam blocks using a friction fit within the channels. Additionally, since the water-absorbent foam blocks that are inserted into the channels have a rectangular shape, the octagonal exterior sidewall results in some open spaces 38 in the channels between the orthogonally oriented foam blocks which creates a space to add water to the foam blocks.

Figure 19:
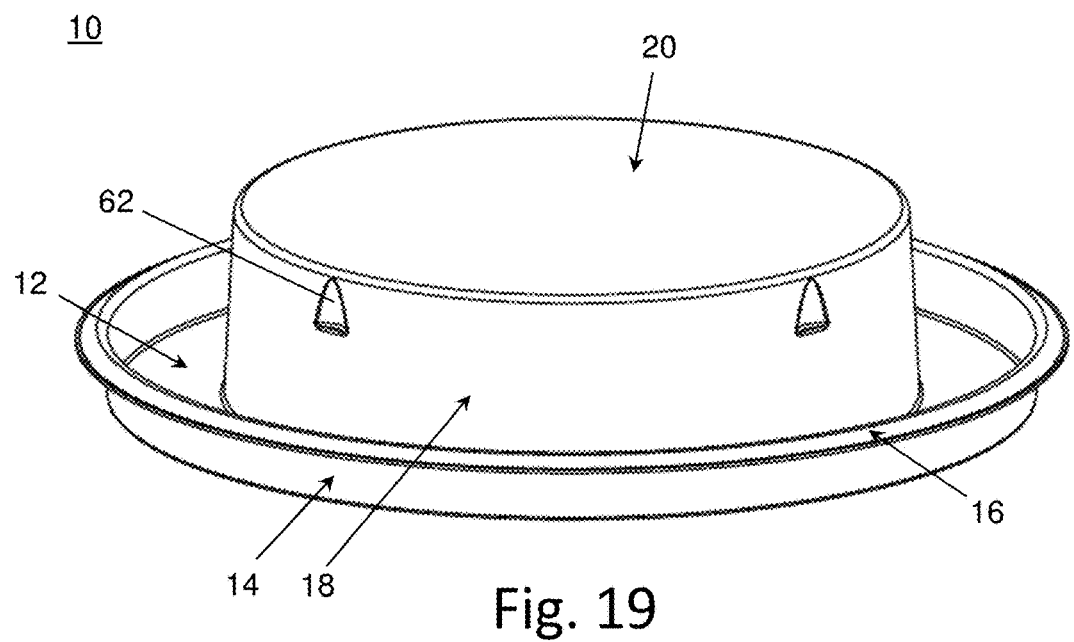
FIG. 19 is an upper perspective view of a third embodiment of the platform tray according to the present invention.
Figure 20:
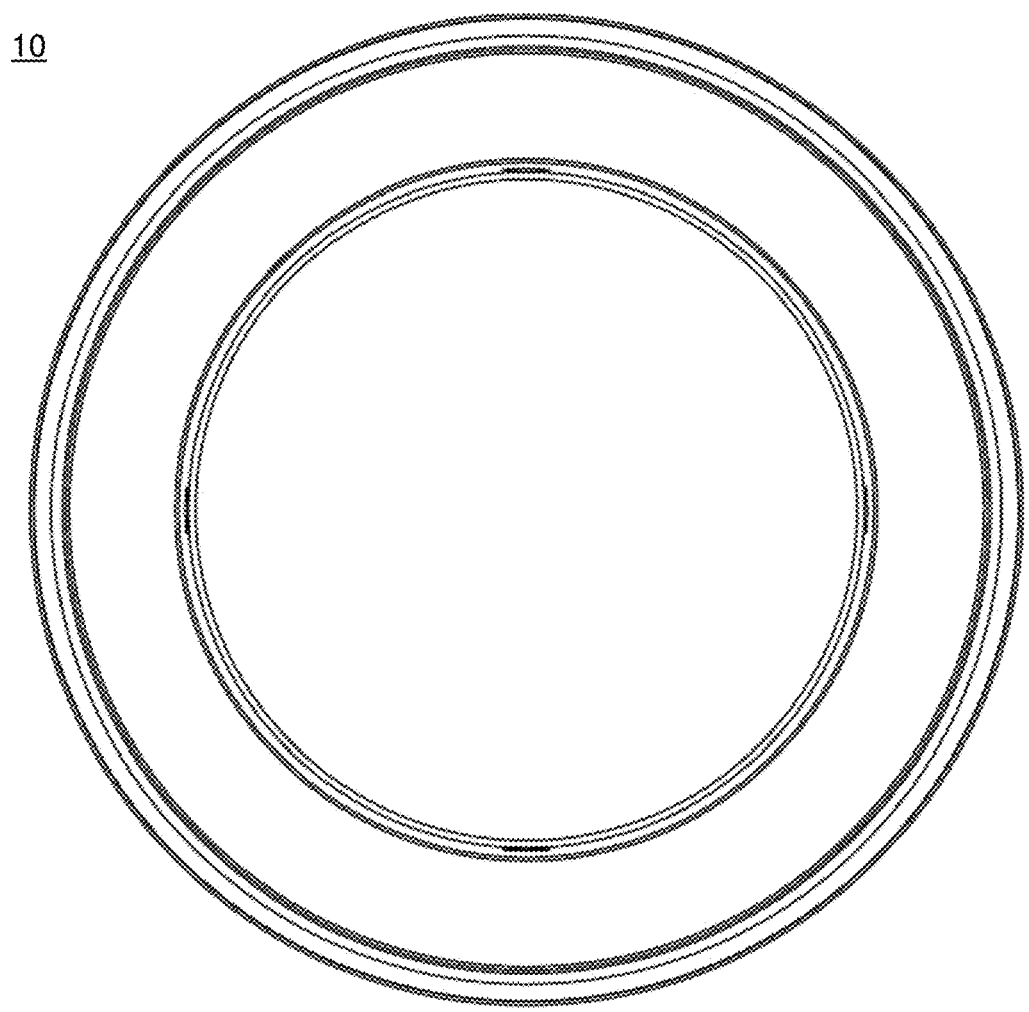
FIG. 20 is a top plan view of the platform tray shown in FIG. 19.
Figure 21A:
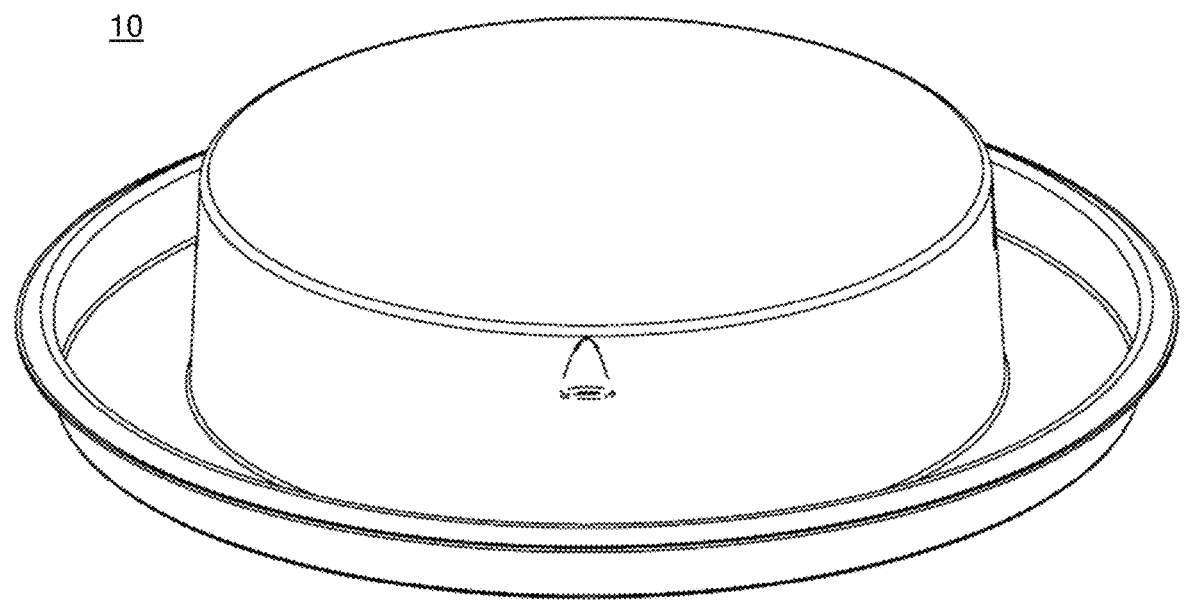
FIGS. 21A and 21B are a shaded upper perspective view and a shaded lower perspective view of the platform tray shown in FIG. 19, respectively.
Figure 21B:
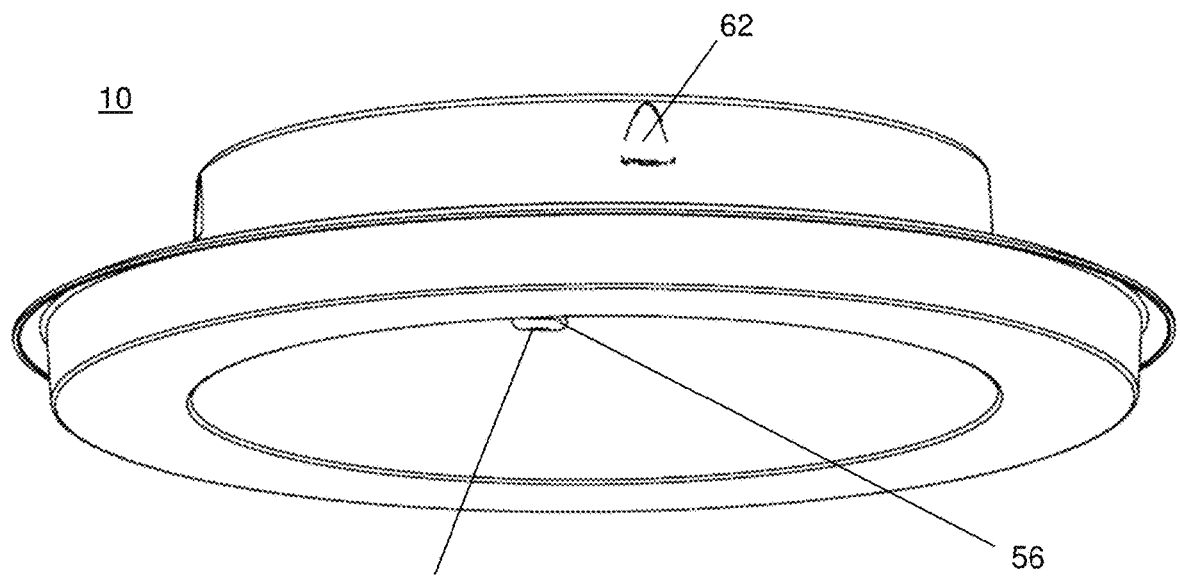
Figure 22:
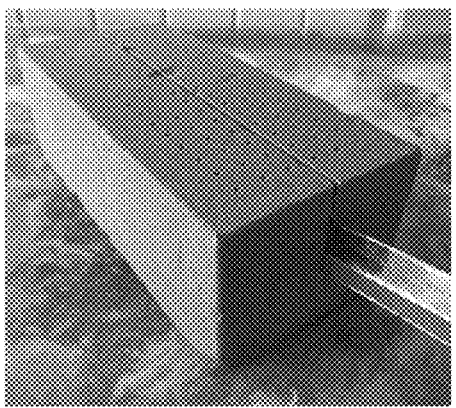
FIG. 22 is a flowchart of a method for using the platform tray of the present invention.
Figure 22:
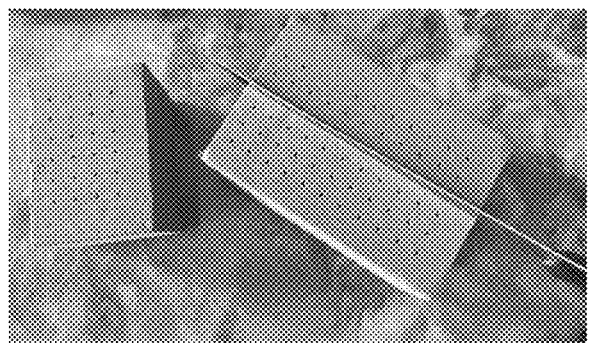
Figure 22:
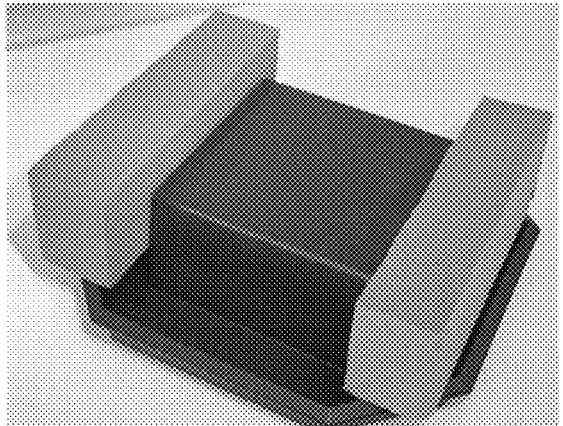
Figure 22:
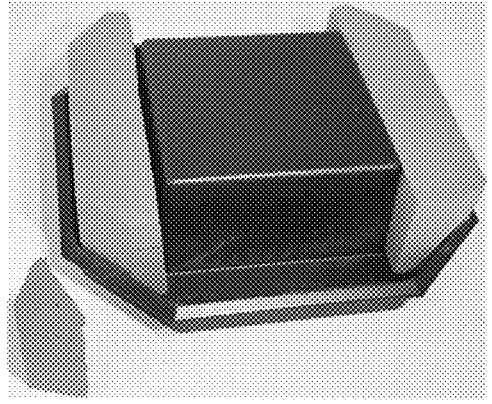
Figure 22:
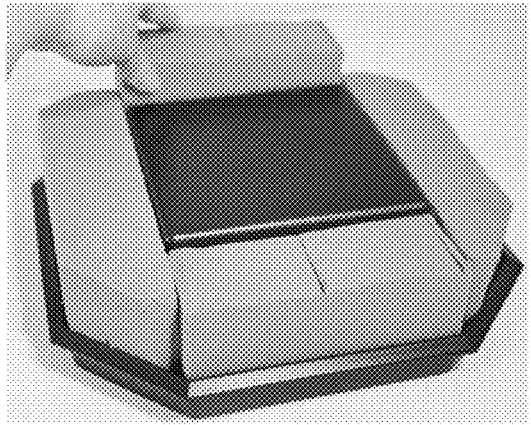
Figure 22:
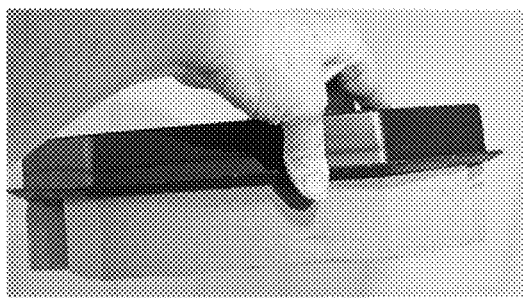

It will be appreciated that the sidewalls of the tray and platform can be formed in other geometric shapes. For example, the shape of the interior sidewall and the exterior sidewall could be triangular as in the '771 Application. It will also be appreciated that the geometric shapes of the sidewalls are not limited to having straight sides. For example, water-absorbent foam is also made in circular rings, and the exterior sidewall and interior sidewall could have concentric circular shapes as shown in FIGS. 19-21 to form a circular channel that can hold the circular rings of water-absorbent foam. The interior sidewall's channel-facing side has a recess 62 so the tab 56 and ledge 58 protrude into the hollow space under the platform. The sidewalls could be formed into more elaborate shapes as could the water-absorbent foam blocks. As explained in more detail below with reference to the flowchart in FIG. 22, it will also be understood that the water-absorbent foam blocks can be cut to fit into the shape of the channels between the interior sidewall and the exterior sidewall. Regardless of the particular cross-sectional shape of the sidewalls and the channels that they form, the taper of the interior sidewalls and the cant of exterior sidewalls of the present invention allow for the nesting of the trays with their platforms while also providing a friction fit for the water-absorbing foam blocks as explained in more detail below.

Regardless of the particular shape of the sidewalls, in the preferred embodiments, the proximal end of the interior sidewall is fixedly attached to the interior section of the base, and the fixed end of the exterior sidewall is fixedly attached to the base at its periphery. The platform preferably has a flat top 46 and a radiused perimeter 48 extending between the flat top and the interior sidewall. As compared to the ribs that extend upward from the riser platforms in the '771 Application, the radiused perimeter around the top of the platform allows the centerpiece or other presentation piece to extend past the perimeter while it maintains contact with the platform's flat top. The free end of the exterior sidewall is located in a plane (C) that is positioned between and parallel to the plane of the base (A) and the plane of the platform's flat top (B). Additionally, the groove is preferably continuous around a perimeter of the exterior sidewall, and the depth of the groove ($D_G$) is preferably greater than twice the thickness of the interior sidewall ($D_G > 2*t_{IS}$).

Figure 10:
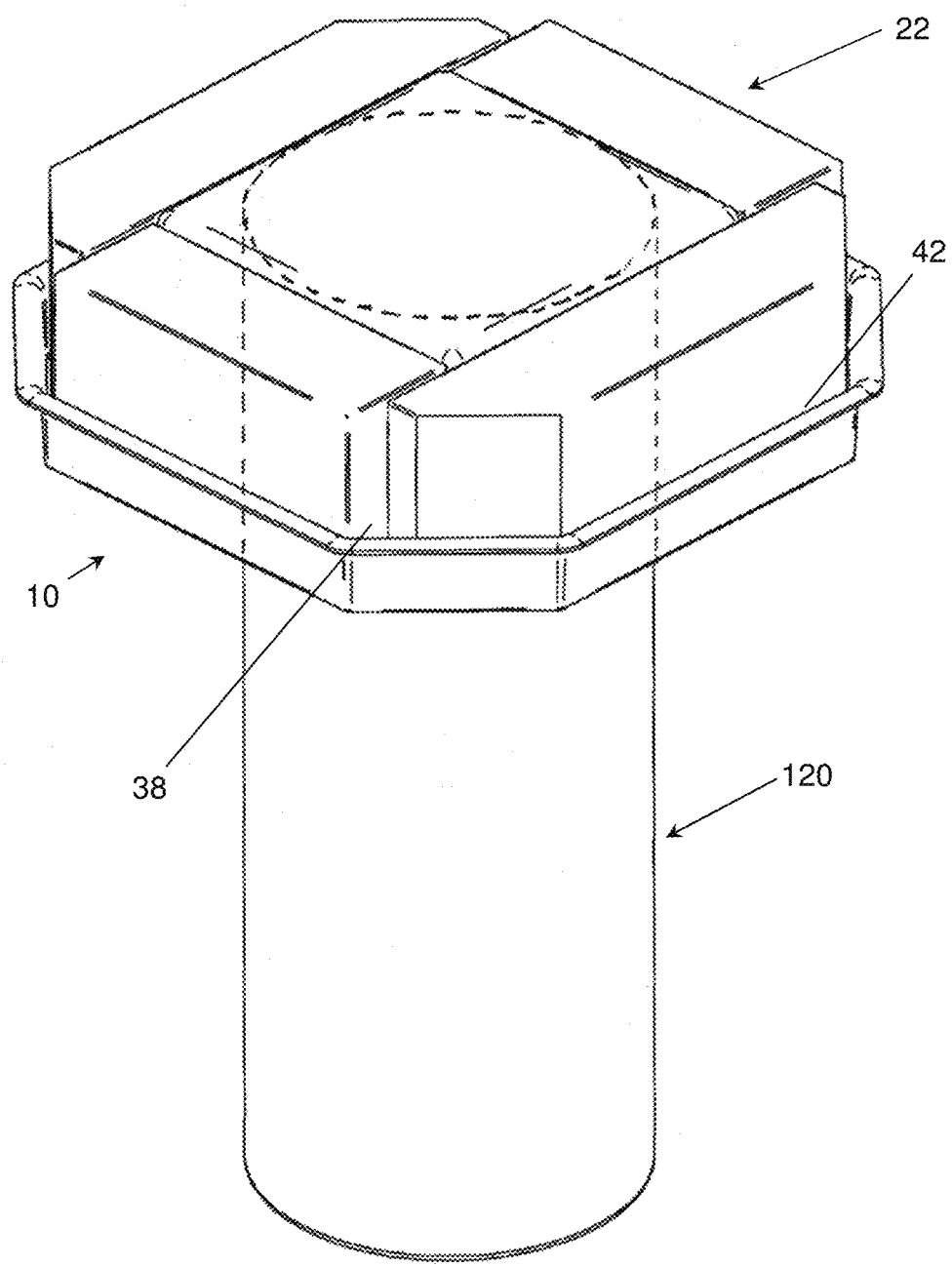
FIG. 10 is an upper perspective view of the platform tray shown in FIG. 1 as positioned over a cylinder.

It will be appreciated that the single-piece construction combined with the hollow space beneath the platform allows the tray to be elevated and supported by a column 120, such as shown in FIG. 10. As explained in the Background section above, the trays in the '799 Patent are also able to be elevated by columns. However, since the trays in the '799 Patent have a solid base and do not have an integrally formed platform, the trays require a downward extending flange that secures the trays to the columns. These flanges prevent the bases of the elevated trays in the '799 Patent from making a flush contact with a flat surface. In comparison, the open section in the base of the present invention leading to the hollow space below the platform allows the column to be inserted up into the hollow space to securely elevate and support the integrally formed tray.

Figure 16A:
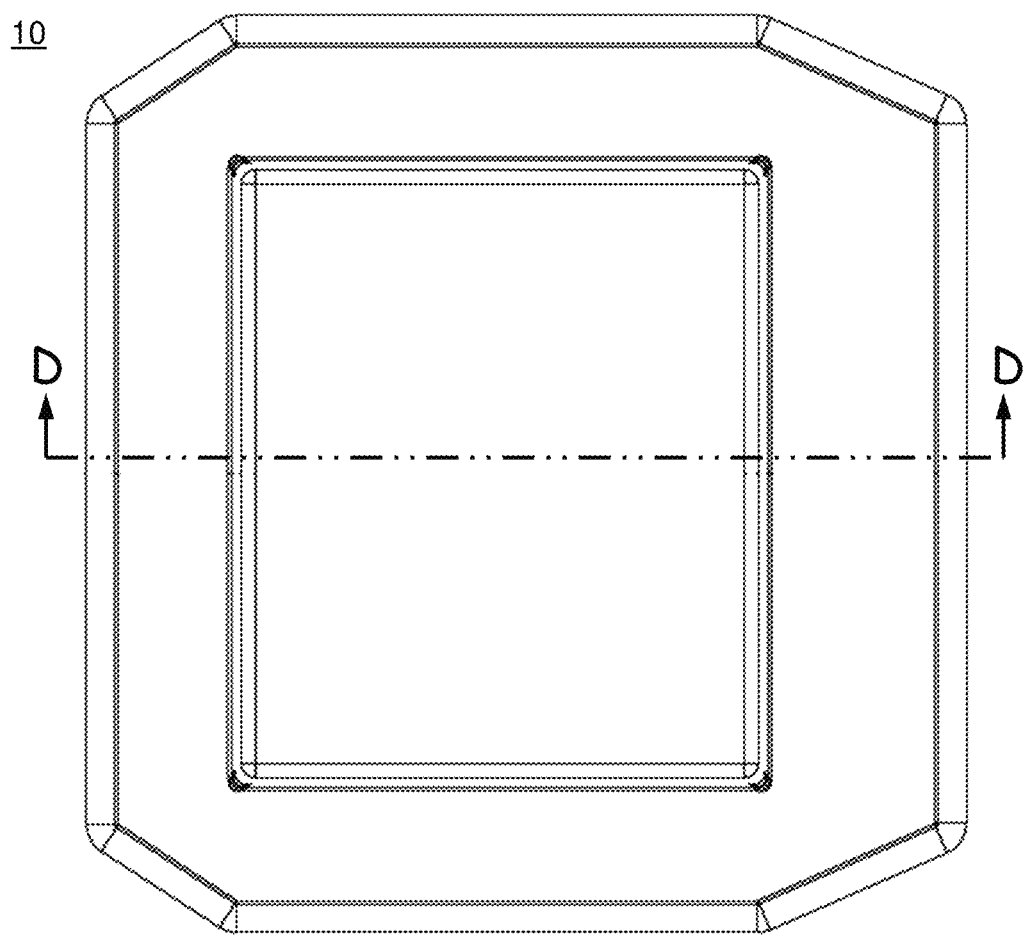
FIG. 16A is a top plan view of the platform tray shown in FIG. 11.
Figure 16B:
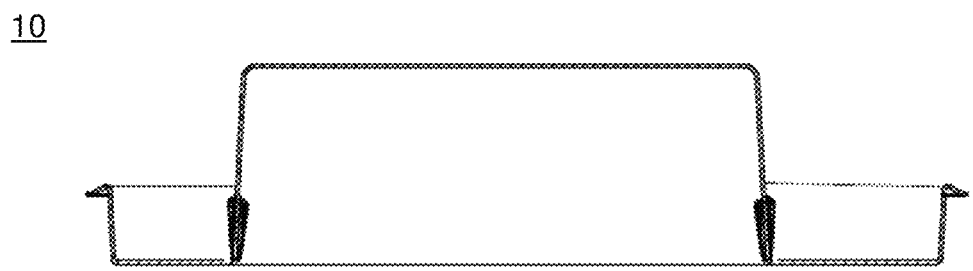
FIG. 16B is a cross-sectional side view of the platform tray shown in FIG. 11 as taken along Section D-D in FIG. 16A.
Figure 17A:
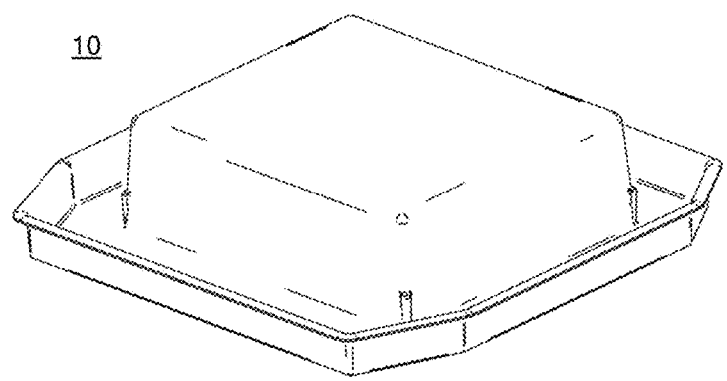
FIGS. 17A-17D are a shaded upper perspective view, a shaded lower perspective view, a shaded top plan view, and a shaded side elevation view of the platform tray shown in FIG. 11, respectively.
Figure 17B:
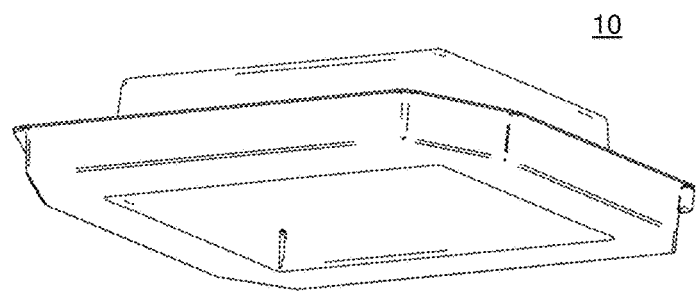
Figure 17C:
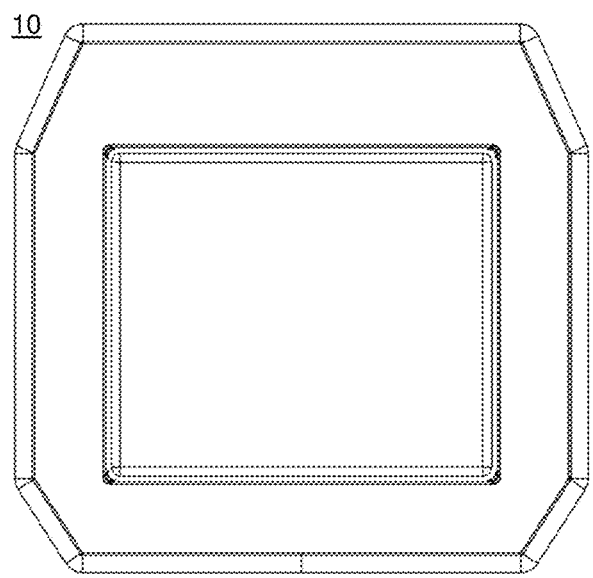
Figure 17D:
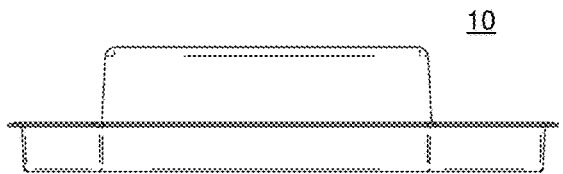

It will also be appreciated that the channels between the interior sidewall and the exterior sidewall do not need to all have the same width. For example, as shown in FIG. 16A, one or more channels can be made wider than the other channels. The wider channel can accommodate a full-sized block of water-absorbing foam which is especially beneficial when large-stemmed flowers or other plants are being placed at the back of the arrangement. The platform is configured so it's flat top is about a quarter of an inch (0.25") above the topside 44 of the foam blocks so the object placed on the top of the platform will not touch the foam.

To ensure that the trays can nest properly, the taper distance ($T_{IS}$) of the interior sidewall from the proximal end to the distal end is greater than the thickness of the interior sidewall ($T_{IS} > t_{IS}$). The taper angle ($\alpha_r$) of the interior sidewalls and the cant angle ($\alpha_C$) of exterior sidewalls are preferably between two to five degrees)(2°-5° from a plane that is perpendicular (A', A") to the base so they allow for the nesting of the trays with their platforms while providing a friction fit for the water-absorbing foam blocks. To help the trays be readily separable from each other and to avoid the trays from becoming wedged together, the tabs limit the distance that an advancing tray's platform can advance into the adjacent tray's hollow space. In the embodiments shown in the drawings, the inward taper angle of the interior sidewalls and the outward cant angle of the exterior sidewalls are each three degrees (3°). Even without the tabs, the total distance of the interior sidewall's taper is less than three (3) times its wall thickness which keeps the bases of adjacent tray separated from each other by a distance that is at least as much as the flange width. The separation between the adjacent trays' bases allows floral designers to place their fingers between the adjacent trays' flanges to help pull them apart.

The tray of the present invention significantly simplifies the preparation required for creating a floral arrangement or floral wreath and greatly reduces the preparation time. The preparation process is described below with reference to FIG. 22.

A. Cut the water-absorbing foam bricks to size for the platform tray's channel in which they will be placed; it is preferable to first soak the foam in water. (220)

Cut a water-absorbing foam brick in half lengthwise on its widest side to create two (2) bricks that are about 9" long×2" wide×3" high.

Cut a third of the brick off of another 9" brick to create a 6" brick. Then cut the 6" brick in half lengthwise.

B. Place 9" water-absorbing foam brick sections onto opposite sides of the platform tray. Trim the corners to fit the tray; then gently press the bricks into the channels to the bottom of the tray for a friction fit between the interior sidewall and the exterior sidewall (222) C. Add the 6" short wet foam bricks into the remaining open channels on opposite sides of the tray and gently press them down to the bottom for the friction fit between the interior sidewall and the exterior sidewall along the sides. (224)

Many floral wreath trays are made from paper-mâché which significantly degrades over a short period of time. Other floral wreaths have thin plastic strips that hold the water-absorbing foam on a stiff plastic dish, with a very low edge, which does not provide a water reservoir. Many of these flat circle trays or wreaths are thin and can crack when loaded and handled. In these situations, heavy duty narrow tape and glue is used use to hold the water-absorbing foam bricks to the tray. Then, there is the circular ring configuration, and tape is wrapped around the foam and backing to help prevent the foam from cracking and falling off when adding flowers. These types of trays or wreaths leak, and many floral designers do not like to use them. In comparison, the floral tray as described above and shown in the drawings is preferably formed of a single sheet of plastic that is thick enough to provide support and which is also a little flexible to help with the friction fit for the foam blocks so it will not crack, degrade, or leak even when replenishing the water.

Nearly all floral trays, wreaths, and inventions thereon fail to provide an adequate lifting surface or a flange for gripping, holding, and carrying a tray. A fully decorated floral arrangement can weigh over ten pounds (10 lbs.), and it can be bulky. The lack of any gripping surface on the tray or wreaths makes it even more difficult to move, and some arrangements are accidentally dropped when there is no edge on the tray or proper way to grip the piece. In many cases, the floral designer must grope under the ornamentation and slide the piece to the table's edge then lift the wreath or tray from the bottom. Some floral trays have a flange, but it is often either very small or is oriented at an oblique angle relative to the tray's sidewall (i.e., upward swept flange) so it is inadequate for lifting given the arrangement. In comparison, the present floral tray invention described above has a flange that flares out approximately one half of an inch (0.5") from the exterior sidewall's free end and forms an acute angle relative to the exterior sidewall, preferably a little more than sixty degrees (60°), to form a continuous groove around perimeter of the present floral tray's exterior sidewall. The downward swept orientation of the flange is approximately thirty degrees (30°) from the plane of the free end which allows the ornamentation of greenery and flowers to naturally flow down over and cover the exterior sidewall, and the groove allows a designer to grasp and lift the present floral tray invention more easily.

Most floral trays have a continuous flat base between the tray's exterior sidewalls, and floral designers use glue, tape, and/or wire to attach several full-sized bricks of water-absorbing foam to the dish to create a base for the flowers. Some floral designers use a closed-cell foam block as a riser in the middle of the tray which must be camouflaged during the prepping process using moisture barrier film with pins. Although the closed-cell foam doesn't absorb water and distributes the load of the presentation piece, it adds weight to the arrangement as compared to the hollow platform of the present invention. Sometimes, floral arrangements become so heavy that the tray cracks when it is moved. In many cases, less than a quarter of the water-absorbable foam used in a tray is efficiently utilized, and water-saturated foam is heavy. As described above for the floral tray according to the present invention, the designer can quickly cut a standard-sized brick of foam in half and press it into the tray's channel where it is gripped with a friction fit between the interior sidewall and the exterior sidewall. Accordingly, no tape, wire, or adhesive is required to hold the foam within the channels of the present invention. The present invention allows the floral designer to use less foam which decreases the arrangement's overall weight, cost, and preparation time. Preparing and securing the foam blocks to the base, according to a popular standard practice currently found in industry, could take up to 20 minutes, whereas the present invention provides floral designers with a preparation process that can be completed in approximately one (1) minute.

Figure 11:
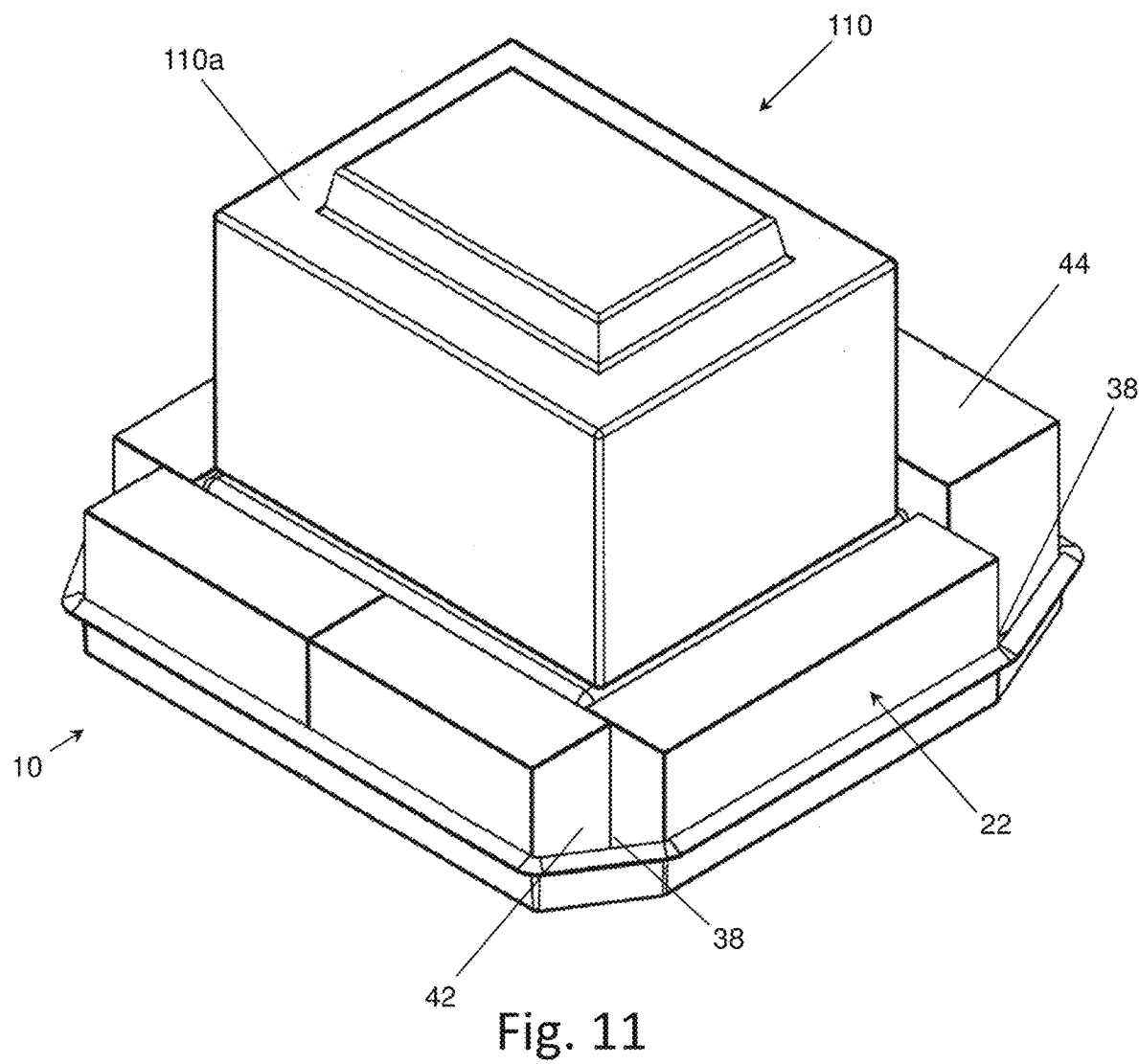
FIG. 11 is an upper perspective view of a second embodiment of the platform tray according to the present invention with blocks of water-absorbing foam and an urn.
Figure 12:
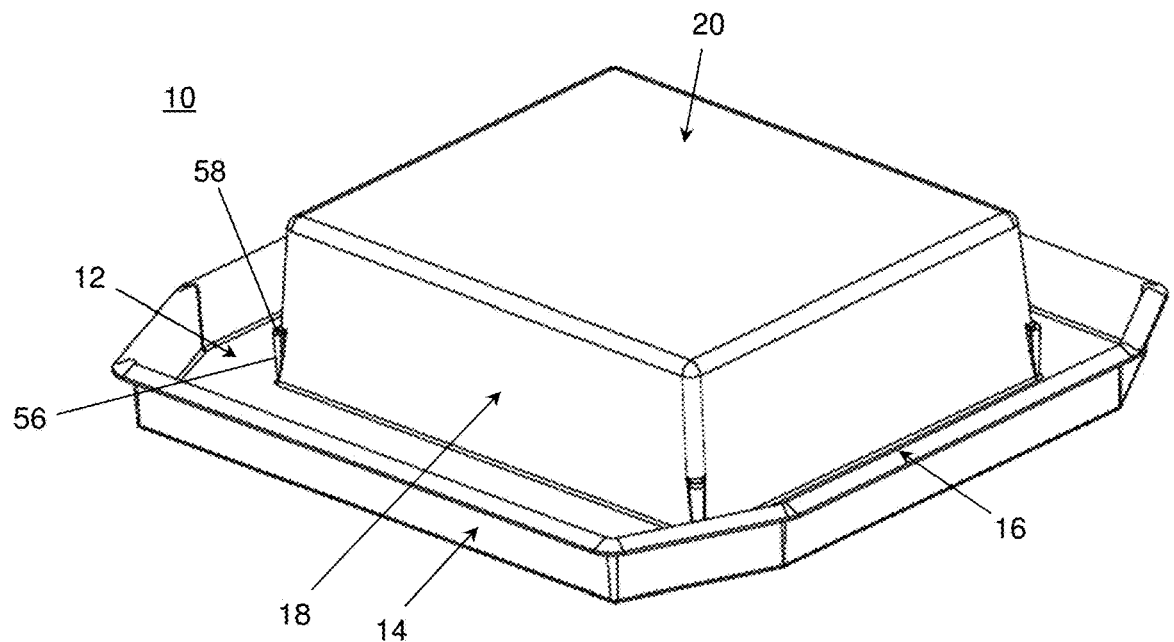
FIG. 12 is an upper perspective view of the platform tray shown in FIG. 11.
Figure 13:
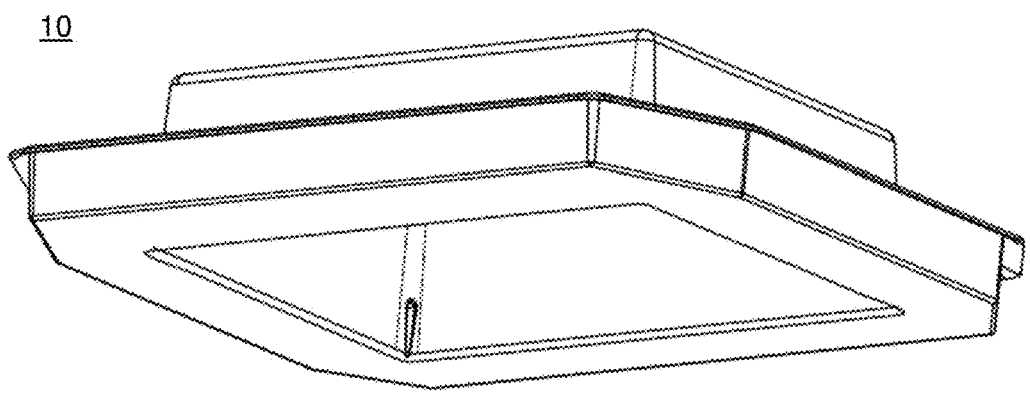
FIG. 13 is a lower perspective view of the platform tray shown in FIG. 11.
Figure 14:
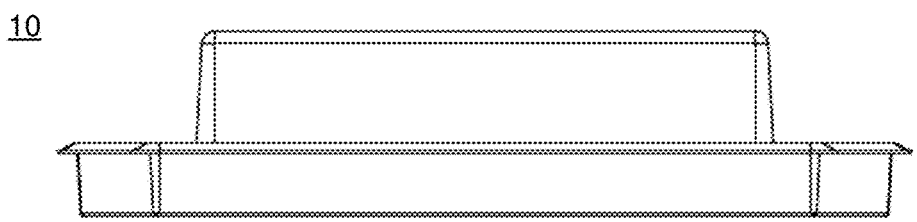
FIG. 14 is a front view of the platform tray shown in FIG. 11.
Figure 15:
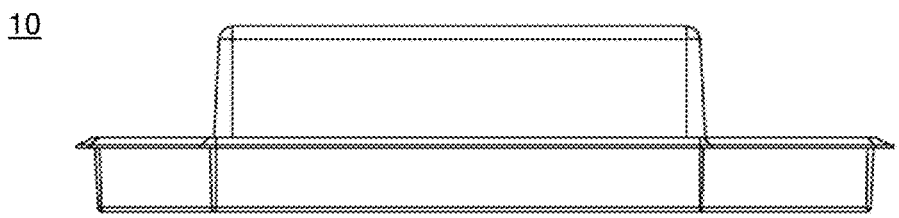
FIG. 15 is a side view of the platform tray shown in FIG. 11.
Figure 18:
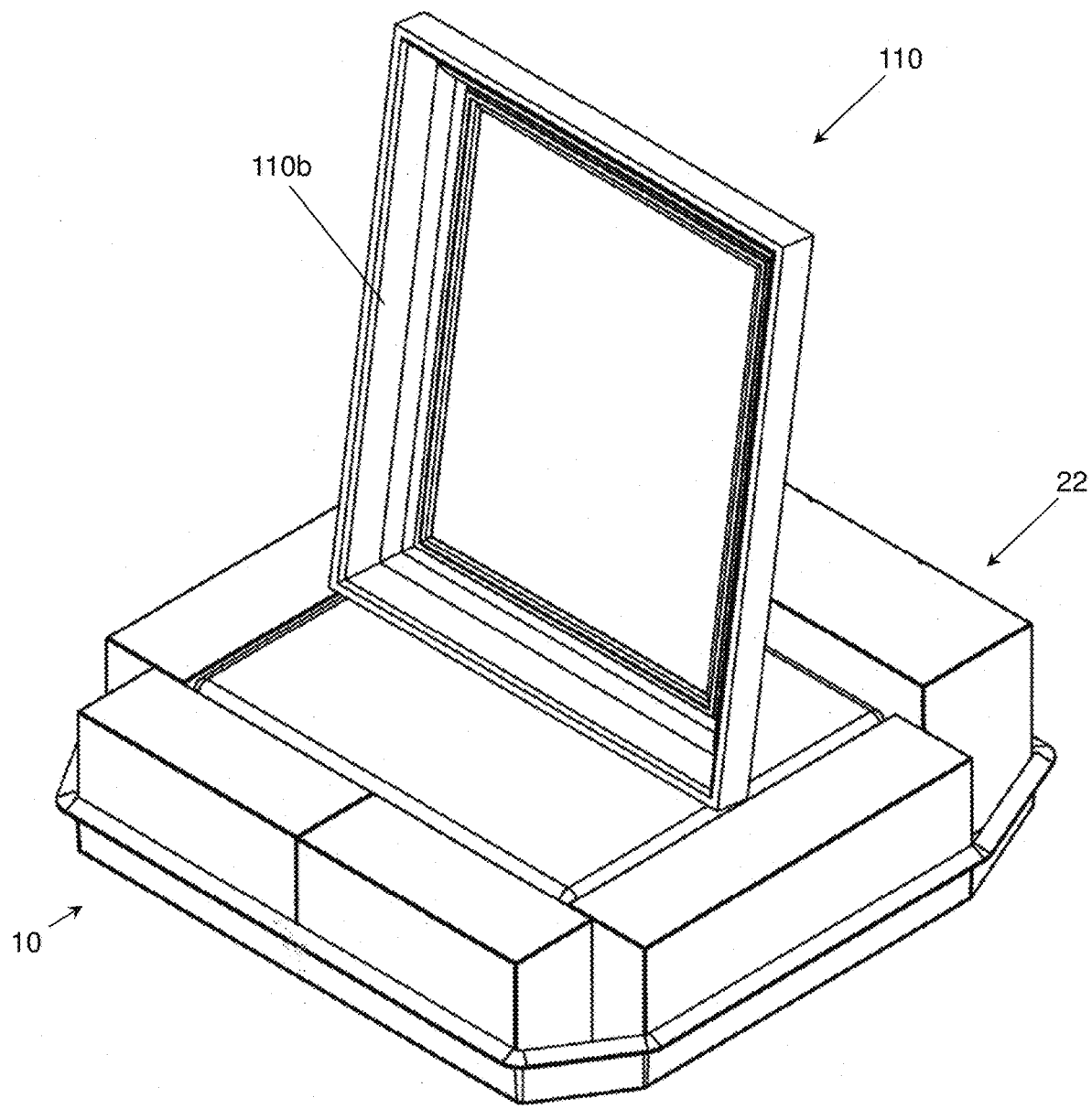
FIG. 18 is an upper perspective view the platform tray shown in FIG. 11 with blocks of water-absorbing foam and a picture frame.

Many floral arrangements have a centerpiece, such as an urn 110*a* such as shown in FIGS. 1 and 11, a picture frame 110*a* such as shown in FIG. 18, a cake, a food tray, a trophy, etc., that is elevated on a platform. With most prior art trays, a platform is either purchased separately or is fabricated with foam. This results in an increase in the weight and cost of the arrangement due to the additional cost of the material and the time that it takes to construct and secure the platform to the base using adhesive, wire, and/or tape (or add it later after delivery because sometimes funeral directors have to use their own platforms). As described above for the floral tray according to the present invention, the present floral tray includes a platform in a single-piece construction. The raised platform is hollow underneath which minimizes the weight of the floral tray and also allows the designer to better grip the tray from the bottom side when it is lifted with the arrangement. Additionally, the integrally formed platform results in less foam being used which saves money and reduces the overall weight of the floral arrangement. The channel for the foam within the tray extends between the perimeters of the interior and exterior sidewalls which moves the foam outward from the platform where it is more effectively utilized. Additionally, since there is no wreath base of foam used as a platform, greens that would have been used to hide the base foam are no longer needed because the platform is already present as an integral part of the tray which saves the user's time, reduces the supplies that are required, and minimizes the weight of the arrangement.

Although it would be less efficient and more wasteful, it will be appreciated that the platform could be formed separate from the tray. In such a case, the tray would preferably be formed with a base that spans the entire bottom portion of the tray between the perimeter of the exterior sidewall. To avoid the need to tape or glue the platform to the tray, the platform's sidewall could have a bottom flange that extends out to the exterior sidewall, and the friction fit of the foam in the channel would hold the tray in place.

For display pieces that are too large to fit on the raised platform, multiple trays can be connected together. For greenhouse owners and plant nurseries that may use the tray for live plants, the channel can be filled with soil and decorative miniature plants, and drain holes can be formed or drilled in the base's interior section to bleed off excessive moisture. Although the embodiments are shown with the base being horizontal, and this is the way that most floral designers will use the tray, some floral designers may choose to hang the tray from an easel or other structure for a vertical display of a wreath. As explained above, the water-absorbent foam has a friction fit connection within the channels' sidewalls, but when the tray is to be held in a vertical or near-vertical orientation, it is preferred to fasten the water-absorbent foam to the tray with additional materials, such as tape, wires, and/or adhesive. The platform's flat surface is then used for the placement of the centerpiece.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the round tray's downward facing tabs could replace the angular trays' upward facing tabs and vice versa. Thus, the breadth and scope of the present invention should not be limited by any of the above-described exemplary embodiments, but should be defined only in accordance with the following claims appended hereto and their equivalents.

What is claimed is:

1. A tray for supporting floral arrangements, comprising:
   a base with a periphery and an interior section within the periphery;
   an exterior sidewall disposed around the periphery of the base, wherein the exterior sidewall extends from a fixed end to a free end, wherein the fixed end is fixedly attached to the base, and wherein the free end is spaced a first distance away from the base;
   a flange flared out from and fixedly attached to the free end of the exterior sidewall, wherein the flange is oriented at an acute angle relative to the exterior sidewall and forms a groove between the flange and the exterior sidewall;
   an interior sidewall disposed around the interior section of the base, wherein the interior sidewall extends from a proximal end to a distal end, wherein the proximal end is supported by the base, wherein the distal end is spaced a second distance away from the base, wherein the second distance is greater than the first distance, wherein the interior sidewall is spaced inwardly from the exterior sidewall and forms a channel between the interior sidewall and the exterior sidewall, wherein the interior sidewall is tapered inwardly from the proximal end to the distal end, wherein the interior sidewall has a thickness, wherein a depth of the groove is greater than twice the thickness of the interior sidewall, and wherein the interior sidewall surrounds a hollow space within the interior section of the base; and
   a platform fixedly attached to the interior sidewall at the distal end.

2. The tray of claim 1, further comprising a water-absorbing foam situated in the channel, wherein a bottom section of the water-absorbing foam is held with a friction fit between the interior sidewall and the exterior sidewall, wherein the proximal end of the interior sidewall is fixedly attached to the interior section of the base, wherein the flange and the groove are continuous around the exterior sidewall at the free end, and wherein the channel is waterproof.

3. The tray of claim 2, wherein the base is located in a first plane, wherein a flat top of the platform is located in a second plane parallel to the first plane, wherein the free end of the exterior sidewall is located in a third plane positioned between and parallel to the first plane and the second plane, wherein the channel has a narrower width one side of the platform and a wider width on an opposite side of the platform, and wherein a topside of the water-absorbing foam is located between the second plane and the third plane.

4. The tray of claim 1, wherein the base, the exterior sidewall, the interior sidewall, the flange, and the platform are integrally formed with each other, wherein the base is comprised of an open section located inwardly of the interior section in the hollow space, and wherein a plurality of trays nest with each other with one tray's platform extending through another tray's open section into the hollow space.

5. The tray of claim 1, wherein the exterior sidewall is canted outwardly from the fixed end to the free end, wherein a cant angle of the exterior sidewall relative to a plane perpendicular to the base is between two degrees and five degrees, inclusive, and wherein a taper angle of the interior sidewall relative to the plane perpendicular to the base is between two degrees and five degrees, inclusive.

6. The tray of claim 1, wherein the interior sidewall has a quadrilateral cross-sectional shape, wherein the exterior sidewall has an octagonal cross-sectional shape, and wherein the exterior sidewall is comprised of a plurality of short sidewall sections between pairs of long sidewall sections.

7. The tray of claim 1, wherein at least one of the interior sidewall and the exterior sidewall is comprised of a ledge protruding into at least one of the channel and the hollow space, and wherein the ledge is located between the base and the platform.

8. The tray of claim 1, wherein the platform is further comprised of a radiused perimeter extending between a flat top of the platform and the interior sidewall, and wherein the radiused perimeter is devoid of any rib extending above the flat top.

9. The tray of claim 1, wherein a taper of the interior sidewall from the proximal end to the distal end is greater than the second thickness of the interior sidewall.

10. The tray of claim 1, wherein the exterior sidewall and the interior section of the base have the same thickness as the interior sidewall.

11. A tray for supporting floral arrangements, comprising:
    a base with a periphery, an interior section within the periphery, and an open section located inwardly of the interior section;

an exterior sidewall disposed around the periphery of the base, wherein the exterior sidewall extends from a fixed end to a free end, wherein the fixed end is fixedly attached to the base, and wherein the free end is spaced a first distance away from the base;

an interior sidewall disposed around the interior section of the base, wherein the interior sidewall extends from a proximal end to a distal end, wherein the proximal end is fixedly attached to the base, wherein the distal end is spaced a second distance away from the base, wherein the second distance is greater than the first distance, wherein the interior sidewall is spaced inwardly from the exterior sidewall and forms a channel between the interior sidewall and the exterior sidewall, wherein the interior sidewall is tapered from the proximal end to the distal end, and wherein the interior sidewall surrounds a hollow space within the interior section of the base; and a platform fixedly attached to the interior sidewall at the distal end, wherein the platform is comprised of a flat top and a radiused perimeter extending between the flat top and the interior sidewall.

12. The tray of claim 11, wherein a plurality of trays nest with each other with one tray's platform extending through the open section of another tray's base into the hollow space, and wherein a taper angle of the interior sidewall relative to a plane perpendicular to the base is between two degrees and five degrees, inclusive.

13. The tray of claim 11, wherein the base, the exterior sidewall, the interior sidewall, and the platform are integrally formed with each other, wherein at least one of the interior sidewall and the exterior sidewall is comprised of a ledge protruding into at least one of the channel and the hollow space, and wherein the ledge is located between the base and the platform.

14. The tray of claim 11, further comprising:
a flange flared out from and fixedly attached to the free end of the exterior sidewall, wherein the flange is oriented at an acute angle relative to the exterior sidewall and forms a groove between the flange and a perimeter of the exterior sidewall; and
a water-absorbing foam situated in the channel, wherein a bottom section of the water-absorbing foam is held with a friction fit between the interior sidewall and the exterior sidewall, and wherein a topside of the water-absorbing foam is located between the free end of the exterior sidewall and the platform.

15. The tray of claim 14, wherein the radiused perimeter is devoid of any rib extending above the flat top, wherein the exterior sidewall is canted outwardly from the fixed end to the free end, wherein a cant angle of the exterior sidewall relative to a plane perpendicular to the base is between two degrees and five degrees, inclusive, wherein the interior sidewall has a thickness, and wherein a depth of the groove is greater than twice the thickness of the interior sidewall.

16. A plurality trays for supporting floral arrangements, comprising:
a first nesting tray comprising a first base, a first exterior sidewall attached to and extending from a first periphery of the first base by a first distance, a first platform spaced a second distance from the base, and a first interior sidewall spaced inwardly from the first exterior sidewall and extending between and attached to the first base and the first platform at a first proximal end and a first distal end, respectively; and
a second nesting tray comprising a second base, a second exterior sidewall attached to and extending from a second periphery of the second base by the first distance, a second platform spaced the second distance from the base, and a second interior sidewall spaced inwardly from the second exterior sidewall extending between and attached to the second base and the second platform at a second proximal end and a second distal end, respectively;
wherein each one of the first base and the second base comprise an interior section within the respective first periphery and second periphery and an open section located inwardly of the interior section, wherein the first interior sidewall and the second interior sidewall are each tapered from the respective first proximal end and second proximal end to the respective first distal end and the second distal end, wherein the first interior sidewall and the second interior sidewall each surround a hollow space within the interior section of the respective first base and second base, wherein each one of the first platform and the second platform comprise a flat top and a radiused perimeter extending between the flat top and the respective first interior sidewall and second interior sidewall, and wherein the first platform of the first nesting tray extends through the open section of the second base into the hollow space of the second nesting tray.

17. The trays of claim 16, wherein each one of the first exterior sidewall and the second exterior sidewall are disposed around the periphery of the respective first base and the second base and extend from a fixed end to a free end, and wherein the radiused perimeter is devoid of any rib extending above the flat top.

18. The trays of claim 17, further comprising a flange flared out from and fixedly attached to the free end of each one of the first exterior sidewall and the second exterior sidewall, wherein the flange is oriented at an acute angle relative to each one of the first exterior sidewall and the second exterior sidewall and forms a continuous groove therebetween.

19. The trays of claim 16, wherein the second distance is greater than the first distance, and wherein a first taper angle of the first interior sidewall and a second taper angle of the second interior sidewall relative to a plane perpendicular to the first base and the second base, respectively, are each between two degrees and five degrees, inclusive.

20. The trays of claim 16, wherein at least one of the first interior sidewall and the first exterior sidewall is comprised of a first ledge protruding toward at least one of the interior section of the first base and the hollow space, wherein at least one of the second interior sidewall and the second exterior sidewall is comprised of a second ledge protruding toward at least one of the interior section of the second base and the hollow space, wherein the first base, the first exterior sidewall, the first interior sidewall, the first ledge, and the first platform are integrally formed with each other, and wherein the second base, the second exterior sidewall, the second interior sidewall, the second ledge, and the second platform are integrally formed with each other.

21. A tray for supporting floral arrangements, comprising:
a base with a periphery and an interior section within the periphery;
an exterior sidewall disposed around the periphery of the base, wherein the exterior sidewall extends from a fixed end to a free end, wherein the fixed end is fixedly attached to the base, and wherein the free end is spaced a first distance away from the base;
a flange flared out from and fixedly attached to the free end of the exterior sidewall, wherein the flange is oriented at an acute angle relative to the exterior sidewall and forms a groove between the flange and the exterior sidewall;

an interior sidewall disposed around the interior section of the base, wherein the interior sidewall extends from a proximal end to a distal end, wherein the proximal end is supported by the base, wherein the distal end is spaced a second distance away from the base, wherein the second distance is greater than the first distance, wherein the interior sidewall is spaced inwardly from the exterior sidewall and forms a channel between the interior sidewall and the exterior sidewall, wherein the interior sidewall is tapered inwardly from the proximal end to the distal end, and wherein the interior sidewall surrounds a hollow space within the interior section of the base;

a platform fixedly attached to the interior sidewall at the distal end; and a water-absorbing foam situated in the channel, wherein a bottom section of the water-absorbing foam is held with a friction fit between the interior sidewall and the exterior sidewall.

22. The tray of claim 21, wherein the interior sidewall has a thickness, wherein a depth of the groove is greater than twice the thickness of the interior sidewall.

23. The tray of claim 21, wherein the platform is further comprised of a radiused perimeter extending between a flat top of the platform and the interior sidewall, and wherein the radiused perimeter is devoid of any rib extending outward from the flat top or the interior sidewall.

* * * * *